US008750208B1

(12) United States Patent
Chindapol

(10) Patent No.: US 8,750,208 B1
(45) Date of Patent: Jun. 10, 2014

(54) PROCESSING AN ACCESS REQUEST IN A WIRELESS COMMUNICATION SYSTEM

(75) Inventor: Aik Chindapol, Washington, DC (US)

(73) Assignee: Sprint Spectrum L.P., Overland Park, KS (US)

( * ) Notice: Subject to any disclaimer, the term of this patent is extended or adjusted under 35 U.S.C. 154(b) by 191 days.

(21) Appl. No.: 13/150,689

(22) Filed: Jun. 1, 2011

(51) Int. Cl.
*H04N 7/16* (2011.01)
*G06F 17/30* (2006.01)

(52) U.S. Cl.
USPC ............... 370/328; 726/4; 726/226; 726/29; 726/3

(58) Field of Classification Search
USPC .................................. 370/202–205; 726/4
See application file for complete search history.

(56) References Cited

U.S. PATENT DOCUMENTS

| 8,149,771 | B2* | 4/2012 | Khivesara et al. | 370/329 |
|---|---|---|---|---|
| 2002/0031120 | A1* | 3/2002 | Rakib | 370/386 |
| 2003/0016174 | A1* | 1/2003 | Anderson | 342/378 |
| 2005/0144200 | A1* | 6/2005 | Hesselink et al. | 707/204 |
| 2008/0052206 | A1* | 2/2008 | Edwards et al. | 705/34 |
| 2008/0313720 | A1* | 12/2008 | Boalt | 726/6 |
| 2009/0288145 | A1* | 11/2009 | Huber et al. | 726/3 |
| 2010/0097940 | A1* | 4/2010 | Asefa et al. | 370/245 |
| 2010/0287585 | A1* | 11/2010 | Frondal et al. | 725/31 |
| 2010/0313009 | A1* | 12/2010 | Combet et al. | 713/150 |
| 2011/0107436 | A1* | 5/2011 | Cholas et al. | 726/29 |

\* cited by examiner

*Primary Examiner* — Andrew Chriss
*Assistant Examiner* — John Lequang

(57) ABSTRACT

A system and method for processing an access request by a wireless device to access an IP data network is provided. An access request from a wireless device is received and denied a predetermined number of times, and the wireless device is granted a limited access to the IP data network. When the access request from wireless device is authenticated, the wireless device is granted an unlimited access to the IP data network.

13 Claims, 7 Drawing Sheets

PROCESSING AN ACCESS REQUEST IN A WIRELESS COMMUNICATION SYSTEM

TECHNICAL BACKGROUND

A wireless device may connect to a network wirelessly. The wireless device can then send and receive data over the network using RF or other similar wireless communication. Such data communication can take the form of data packets, and the data communication can convey voice, media, or other information.

Prior to establishing a network connection, a wireless device must be authenticated by the network to determine that the wireless device is authorized to access the network. Typically, a wireless device transmits an access request with authentication credentials to a wireless network, and the network uses the credentials to determine if the wireless device is authorized, and thereafter an authorized device is granted access to the network. Such authentication processes are usually transparent to a wireless device user.

In some situations, a wireless device may not be authenticated and authorized to access the network. For example, a wireless device may lack a valid credential because a user account has been suspended or inactivated. Furthermore, the data of a device credential may have become corrupted. In such cases, the wireless device will not be authorized to access the network. Wireless devices are typically configured to repeatedly transmit an access request if the wireless device is denied authorization to access the network. Repeated attempts to access the network consume system resources including radio and backhaul bandwidth and processor load at network nodes.

OVERVIEW

A system and method for processing an access request by a wireless device to access an IP data network is provided. In one embodiment, when an access request from a wireless device is received and denied a predetermined number of times, the wireless device is granted a limited access to the IP data network. When the access request from wireless device is authenticated, the wireless device is granted an unlimited access to the IP data network.

DETAILED DESCRIPTION

In an embodiment, an access request from a wireless device to access an IP data network is received and denied a predetermined number of times. The wireless device is granted a limited access to the IP data network. When the access request from the wireless device is authenticated, the wireless device is granted an unlimited access to the IP data network.

Figure 1:
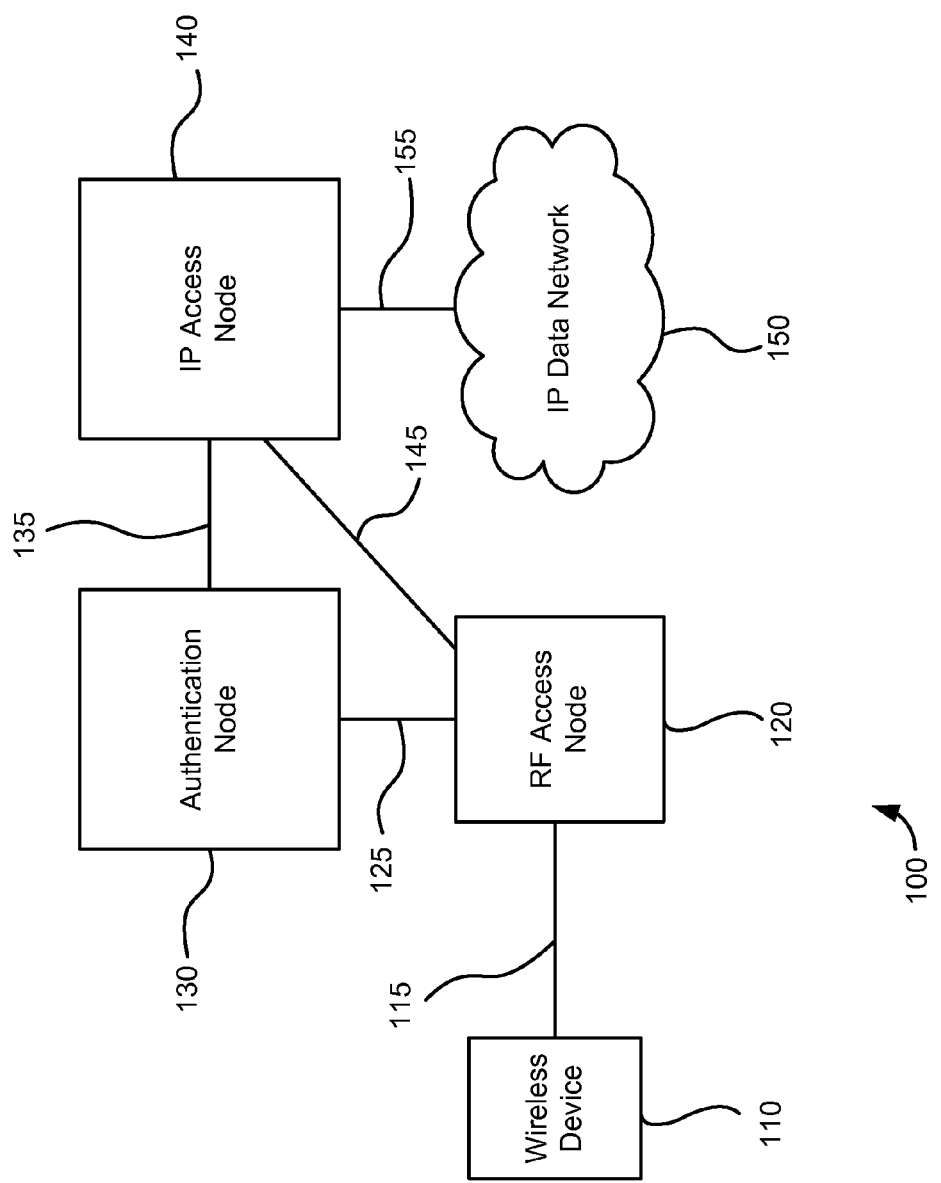
FIG. 1 is a block diagram that illustrates an exemplary wireless communication network.

FIG. 1 is a block diagram that illustrates an exemplary communication network 100. The communication network 100 comprises a wireless device 110, an RF access node 120, an authentication node 130, an IP access node 140, and an IP packet data network 150. Other network elements may be present in the communication system 100 to facilitate wireless communication but are omitted for clarity, such as base station controllers, gateways, mobile switching centers, dispatch application processors, and location registers such as a home location register or visitor location register. Examples of a wireless device 110 include a telephone, a computer, a personal digital assistant, an internet access device, or other device capable of wireless communication, including combinations thereof. The wireless device 110 is in communication with RF access node 120 through communication link 115. RF access node 120 can be any network element capable of transmitting and receiving an RF signal to facilitate communication with the wireless device 110, such as a base station.

RF access node 120 is in communication with authentication node 130 and IP access node 140 through communications links 125 and 145. Authentication node 130 can be any network element capable of providing authentication services to authenticate a network access request from the wireless device 110, such as an authentication, authorization and accounting (AAA) server. The authentication node 130 is in communication with IP access node 140 through communication link 135. IP access node 140 can be any network element capable of providing services to facilitate access to the IP data network 150, and in particular to facilitate access by the wireless device 110 to the IP data network 150. IP data network can be any network or internetwork capable of packet data communication with the wireless device 110 facilitated by the IP access node 140. Data communication over the IP data network 150 can be in the form of data packets, and can convey voice, media and other information. The IP access node and the IP data network 150 are in communication through communication link 155.

Communication link 115 is a wireless communication link. Communication links 125, 135 and 145 can be wired or wireless communication links, or a combination thereof. Wired communication links can be, for example, twisted pair cable, coaxial cable or fiber optic cable. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE). Other wireless protocols can also be used.

In one embodiment, a wireless device attempts to access an IP data network but is unsuccessful, and the wireless device attempts again to access the IP data network. When the wireless device's attempts to access the IP data network are denied a predetermined number of times, the wireless device is granted a limited access to the IP data network. The limited access is an access less than an unlimited access, and is further described below. After being granted the limited access to the IP data network, the wireless device may be authenticated, and may be granted an unlimited access to the IP data network.

Figure 2:
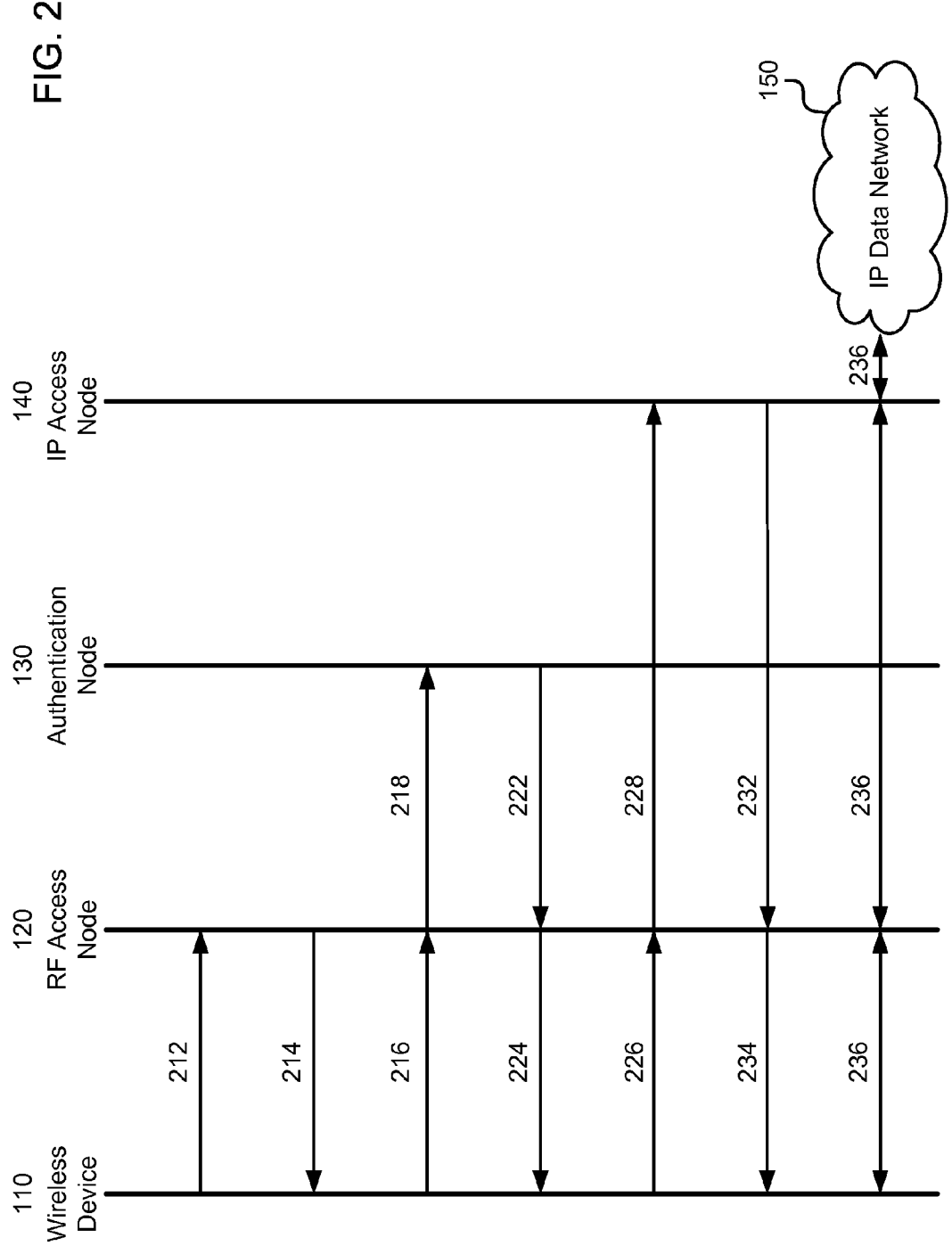
FIG. 2 is a signal flow diagram that illustrates an exemplary successful request to access a network.

FIG. 2 is a signal flow diagram illustrating an exemplary successful request to access a network by a wireless device.

The wireless device 210 transmits a network entry request 212 to an RF access node 120, and the RF access node 120 responds with an indication that the network entry request is successful 214. After receiving the success indication from the RF access node 120, the wireless device 110 transmits an authentication request 216 including credentials to the RF access node 120. The RF access node conveys the authentication request 218 to the authentication node 130, which performs an authentication of the wireless device 110 based on the credentials. If the authentication node determines that the wireless device 110 is authorized to access the network, the authentication node 130 transmits an authentication success indication 222 to RF access node 120, which conveys the authentication success indication 224 to the wireless device 110. Upon receipt of the authentication success indication 224, the wireless device 110 transmits a service request 226 to the RF access node 120, and in response the RF access node 120 transmits a connection setup request 228 to the IP access node 140. The IP access node 140 responds with a connection setup response 232 to set up a bidirectional communication session between the wireless device 110 and the IP data network 150. The connection setup response 232 can include an IP address assignment for the wireless device 110. The RF access node 120 and the IP access node 140 may also negotiate a quality of service (QoS) to be provided to the wireless device 110, which can be based on subscriber account information, available network resources, and/or a QoS level requested by the wireless device 110, as well as other factors. The RF access node 120 then transmits a service response success message 234 to the wireless device 110. Thereafter the wireless device 110 can conduct bidirectional communication 236 with the IP data network 150 facilitated by the RF access node 120 and the IP access node 140.

Figure 3:
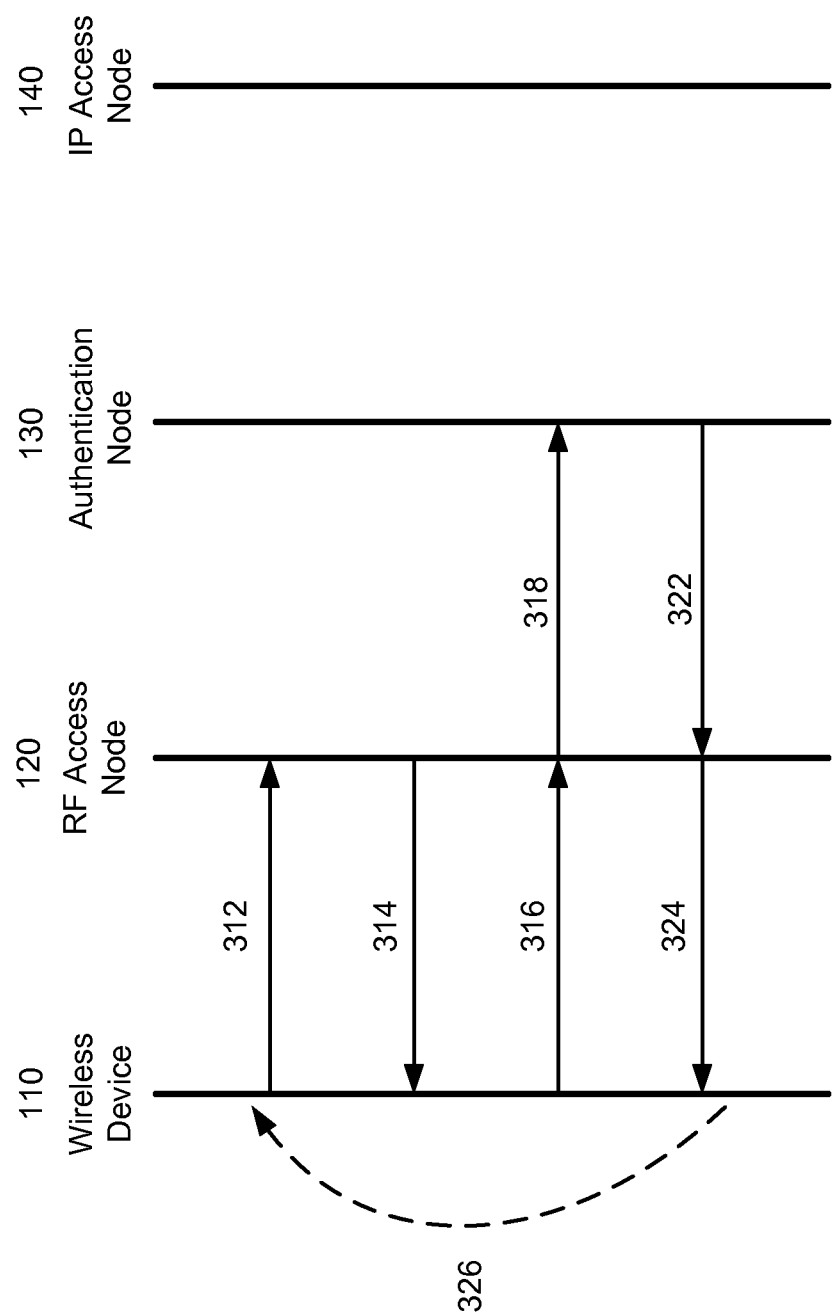
FIG. 3 is a signal flow diagram that illustrates an exemplary wireless device authentication failure.

FIG. 3 is a signal flow diagram illustrating a case of a wireless device authentication failure. The wireless device 110 transmits a network entry request 312 to an RF access node 120, and the RF access node responds with an indication that the network entry request is successful 314. After receiving the success indication from the RF access node 120, the wireless device transmits an authentication request 316 including credentials to the RF access node 120. The RF access node 120 conveys the authentication request 318 to the authentication node 130, which performs an authentication of the wireless device 110 based on the credentials. In this case, the credentials transmitted by the wireless device 110 are determined by the authentication node 130 to be not valid. Many factors may lead to such a determination. For example, a wireless device may lack a valid credential because a user account has been suspended or inactivated. As another example, the credential data may have become corrupted.

Furthermore, the authentication request 318 may be a single message which must be received entirely, or it may be a plurality of messages which must be received in a sequence, to authenticate the wireless device 110. Failure to receive the entire authentication request 318, or to receive the authentication request out of sequence, may cause the authentication node 130 to determine the credentials to be not valid. Transmission failure, network timeout, packet loss, and poor RF or other network conditions can cause the authentication request 318 to arrive at the authentication node 130 incomplete, out of sequence, not to arrive altogether.

In any event, the authentication node 130 determines that the wireless device credential is not valid, and transmits an authentication failure response 322 to the RF access node 120, which conveys the authentication failure response 324 to the wireless device 110. In addition, the RF access node 120 may require that it receive an authentication response from the authentication node 130 within a predetermined period of time, and if the RF access node 120 receives no response from the authentication node 130, the RF access node may convey the authentication failure response 324 to the wireless device 110.

If the wireless device 110 receives the authentication failure response 324, or if the wireless device receives no response within a predetermined period of time, the wireless device is configured to retransmit the network entry request and the authentication request. The wireless device restarts the process 326 and retransmits the network entry request 312 and the authentication request 316. Because the wireless device's credential is not valid, or because persistent conditions (transmission failure, network timeout, packet loss, and poor RF or other network conditions) prevent the RF access node from successfully transmitting the authentication request 318 to the authentication node 130, the authentication node 130 again does not successfully authenticate the wireless device 110. The authentication node 130 will transmit another authentication failure response 322 to the RF access node 120, or the RF access node may again fail to receive a response from the authentication node within a pre-determined period of time. This can result in the wireless device 110 repeatedly retransmitting the network entry request 312 and the authentication request 316. Since the authentication process is typically transparent to a user of the wireless device, there will be no indication to the user that this is occurring. The repeated authentication failure and retransmission of request messages by the wireless device 110 consumes network resources, such as air interface and backhaul bandwidth, and increases processor load at network nodes, degrading network performance. It can also cause the rapid depletion of the wireless device battery, frustrating the wireless device user.

Figure 4:
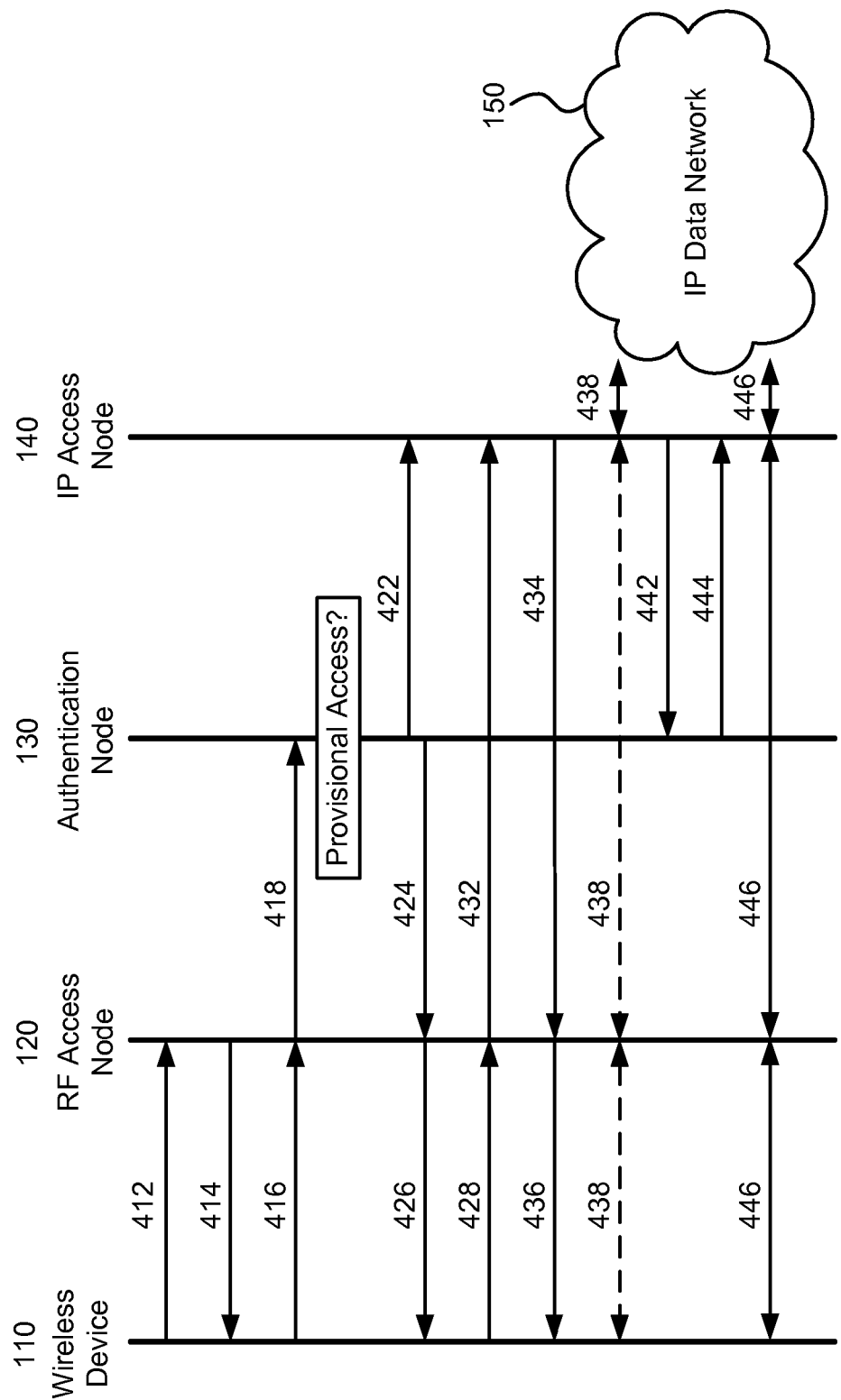
FIG. 4 is a signal flow diagram that illustrates an example of granting a wireless device limited access to an IP data network.

FIG. 4 is a signal flow diagram illustrating an example of granting a wireless device limited access to an IP data network. The wireless device 110 transmits a network entry request 412 to an RF access node 420, and the RF access node 120 responds with an indication that the network entry request is successful 414. After receiving the success indication from the RF access node 120, the wireless device 110 transmits an authentication request 416 including credentials to the RF access node 120. The RF access node 120 conveys the authentication request 418 to the authentication node 130, which performs an authentication of the wireless device 110 based on the credentials. In this case, the authentication node 130 determines that the credentials of the wireless device 110 are not valid. However, the authentication node 130 determines to grant to the wireless device 110 provisional access to the IP data network 150. This determination will be further described below. The authentication node 130 informs the IP access node 140 of the determination to grant the wireless device 110 provisional access to the IP data network 150 with a provisional access notice 422. The authentication node 130 also transmits an authentication success indication 424 to the RF access node 120, which conveys the authentication success indication 426 to the wireless device 110.

Upon receipt of the authentication success indication 426, the wireless device 110 transmits a service request 428 to the RF access node 120, and the RF access node 120 transmits a connection setup request 432 to the IP access node 140. The IP access node 140 responds with a connection setup response 434 to set up a bidirectional communication session between the wireless device 110 and the IP data network 150. The connection setup response 434 can include an IP address assignment for the wireless device 110. Since the IP access node 140 was informed that the wireless device 110 is being granted provisional access (with provisional access notice 422), the IP access node 140 may assign an IP address from a dedicated set or range of IP addresses which are assigned to devices being granted such provisional access. The RF access node 120 and the IP access node 140 may also negotiate a QoS to be provided to the wireless device 110, which can be based on subscriber account information, available network resources, and/or a QoS level requested by the wireless device 110, as well as other factors. The RF access node 120 then transmits a service response success message 436 to the wireless device 110. Thereafter the wireless device 110 can conduct limited bidirectional communication 438 with the IP data network 150 facilitated by the RF access node 120 and the IP access node 140. Limited bidirectional communication under provisional network access is further described below.

The wireless device 110 may later be granted unlimited access to the IP data network 150. The IP access node 140 transmits a provision update message 442 to the authentication node 130, and the authentication node 130 sends an unlimited access notice 444 to the IP access node 440. Thereafter, the wireless device 110 is granted unlimited access to the IP data network 150, and may conduct unlimited bidirectional communication 446 with the IP data network 150 facilitated by the RF access node 120 and the IP access node 140.

The provisional bidirectional communication 446 between the wireless device 110 and the IP data network 150 can be limited in various ways. For example, access to the IP data network 150 can be limited for a period of time, after which time period the provisional access can be terminated. The provisional access can also be limited to a maximum data rate, so that the wireless device 110 can access network services which are not data rate sensitive, but will not have access to a data rate which can support data rate sensitive applications, such as voice over internet protocol (VoIP) or streaming video applications. The provisional access can also be limited to a maximum amount of data, such that when the wireless device 110 has received a predetermined amount of data from the IP data network 150 the provisional access can be terminated. Also, the use of certain data intensive applications, such as VoIP or streaming video applications, can be blocked so that the wireless device 110 may use only a subset of services or functions of the IP data network 150. Blocked applications can be identified at various levels of specificity, such as identifying specific applications to be blocked, or by blocking applications of a specified type or types. In addition, the wireless device 110 can be prevented from using applications or services on the IP data network 150 which require a bandwidth greater than a predetermined threshold, effectively preventing the wireless device 110 from using data rate sensitive applications. Other methods of limiting the access of the wireless device 110 to the IP data network 150 are also possible.

The limited access to the IP data network 150 can provide the wireless device 110 with the opportunity to remedy the factor or factors that render the device's credentials invalid. For example, if a user account has been suspended because a subscription payment is outstanding, the provisional access allows the user to make such payment over the IP data network 150. If the wireless device's credential data has been corrupted, the provisional access allows the user to input information, such as account information and/or identifying information, which allows the wireless device to obtain a new credential from the network. If the wireless device 110 is attempting to access the network from an unauthorized location, such as a foreign network where wireless device 110 is not authorized, the provisional access allows the user to input, for example, identity and/or payment information, to be authorized to access the network from the otherwise unauthorized location. Other applications of the grant of limited provisional access to the wireless device 110 are also possible.

Figure 5:
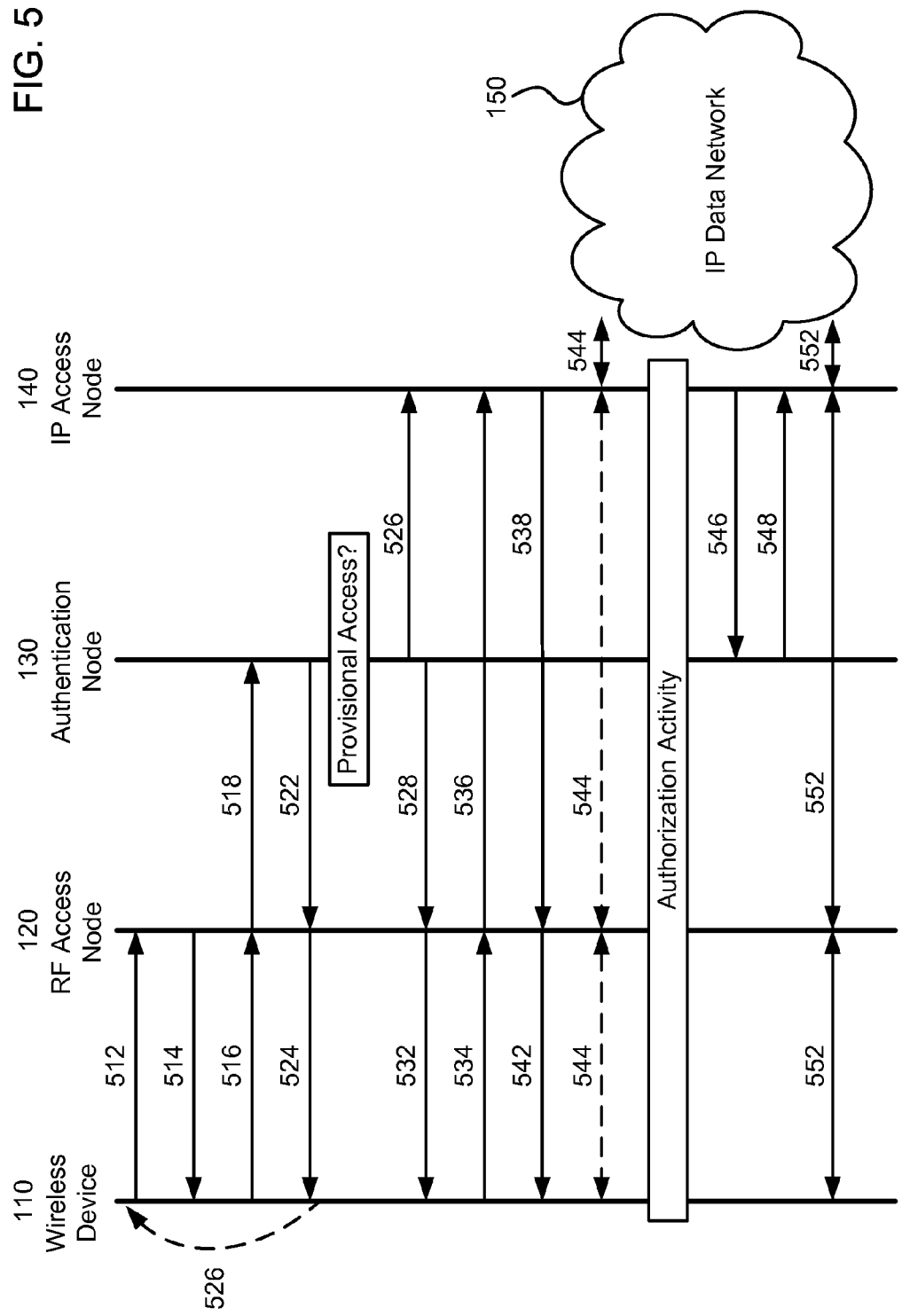
FIG. 5 is another signal flow diagram that illustrates an example of granting a wireless device limited access to an IP data network.

FIG. 5 is a signal flow diagram illustrating another example of granting a wireless device limited access to an IP data network. The wireless device 110 transmits a network entry request 512 to an RF access node 120, and the RF access node 120 responds with an indication that the network entry request is successful 514. After receiving the success indication from the RF access node 120, the wireless device 110 transmits an authentication request 516 including credentials to the RF access node 120. The RF access node 120 conveys the authentication request 518 to the authentication node 130, which performs an authentication of the wireless device 510 based on the credentials. In this case, the authentication node 130 determines that the credentials of the wireless device 110 are not valid, and the authentication node 130 transmits an authentication failure response 522 to the RF access node 520, which conveys the authentication failure response 524 to the wireless device 510. The wireless device restarts the process 526 and retransmits the network entry request 512 and the authentication request 516. Because the wireless device's credential is not valid, the authentication node 130 again does not successfully authenticate the wireless device 110. After the authentication node 130 determines that the credentials of the wireless device 110 are not valid and transmits an authentication failure response 522 a predetermined number of times, the authentication node 130 determines to grant the wireless device 110 provisional access to the IP data network 150. The authentication node 130 informs the IP access node 140 of the determination to grant the wireless device 110 provisional access to the IP data network 150 with a provisional access notice 526. The authentication node 130 also transmits an authentication success indication 528 to the RF access node 120, which conveys the authentication success indication 532 to the wireless device 110.

Upon receipt of the authentication success indication 532, the wireless device 110 transmits a service request 534 to the RF access node 120, and the RF access node 520 transmits a connection setup request 536 to the IP access node 140. The IP access node 140 responds with a connection setup response 538 to set up a bidirectional communication session between the wireless device 110 and the IP data network 150. The connection setup response 538 can include an IP address assignment for the wireless device 110. The RF access node 120 and the IP access node 140 may also negotiate a QoS to be provided to the wireless device 110. The RF access node 120 then transmits a service response success message 542 to the wireless device 110. Thereafter the wireless device 110 can conduct limited bidirectional communication 544 with the IP data network 150 facilitated by the RF access node 120 and the IP access node 140.

The wireless device 110 can be granted unlimited access to the IP data network if the wireless device 110 performs an authorization activity to remedy the factor or factors that render the device's credentials invalid. For example, if a user account has been suspended because a subscription payment is outstanding, the user can make such payment over the IP data access network. If the wireless device's credential data has been corrupted, the provisional access allows the user to input information, such as account information and/or identifying information, to allow the wireless device 110 to obtain a new credential from the network. Similarly, the wireless device 110 may negotiate the download of a new credential from the network without user involvement. Also, if the wireless device 110 is attempting to access the network from an unauthorized location, such as a foreign network where it is not authorized, the user can input, for example, identity and/or payment information, to be authorized to access to the network from the otherwise unauthorized location. Further, a user may update a service agreement to permit authorization in a foreign network, or to re-authorize a lapsed or suspended user account. In addition, a user may verify authentication credentials, for example to verify the identity of the user, for example, when an authentication credential has become corrupted, or if the transmission of otherwise acceptable credentials has been unsuccessful (because of, e.g., poor RF channel or other network conditions). Other applications of the grant of limited provisional access to the wireless device are also possible.

The IP access node 140 transmits a provision update message 546 to the authentication node 130, and the authentication node 130 sends an unlimited access notice 548 to the IP access node 140. Thereafter, the wireless device 110 is granted unlimited access to the IP data network 150, and may conduct unlimited bidirectional communication 552 with the IP data network 150 facilitated by the RF access node 120 and the IP access node 140.

Figure 6:
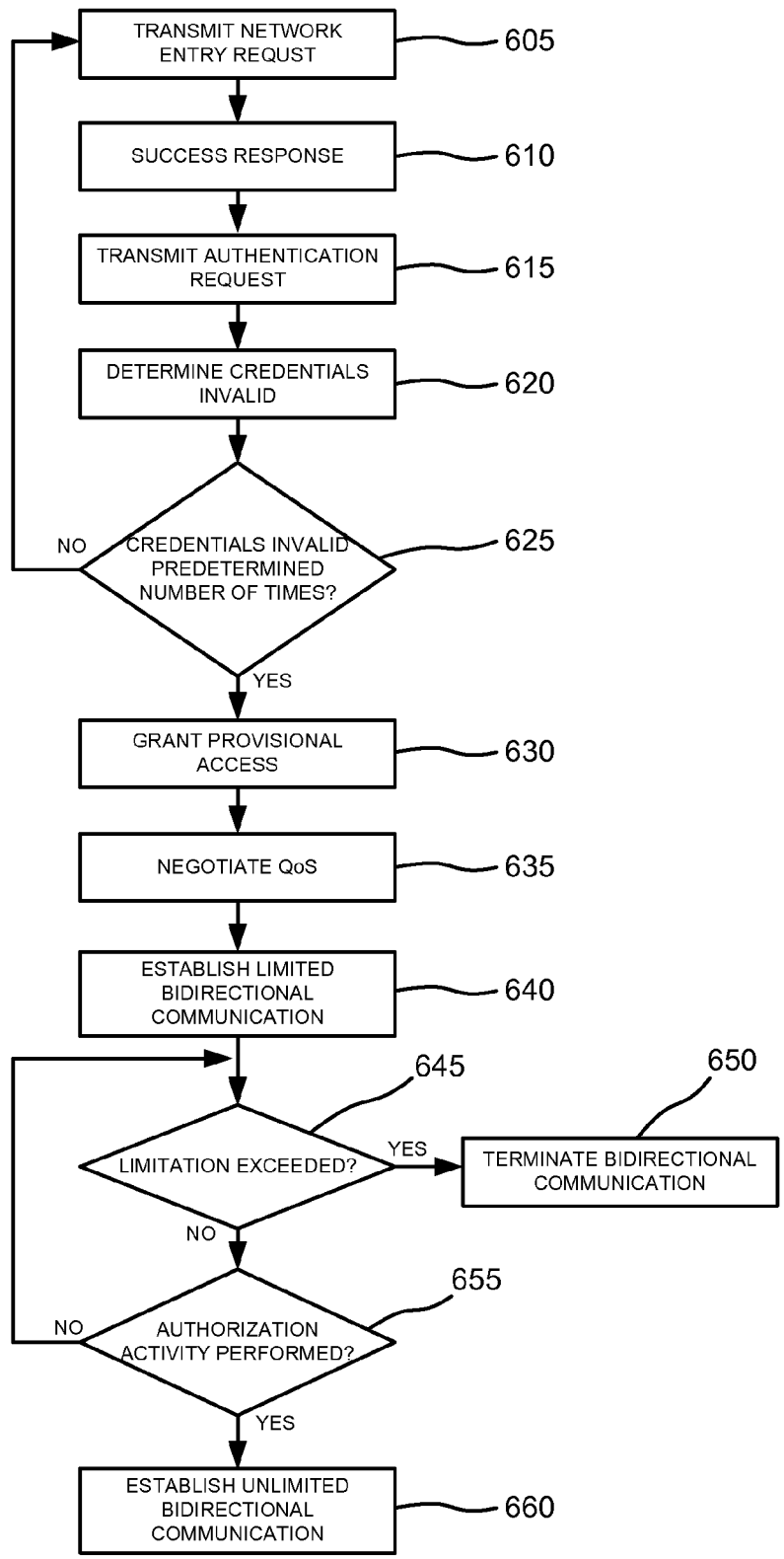
FIG. 6 is a flowchart illustrating an example of granting a wireless device limited access to an IP data network.

FIG. 6 is a flowchart illustrating an example of granting a wireless device limited access to an IP data network. As described above with respect to FIGS. 4 and 5, the wireless device 110 transmits a network entry request to an RF access node 420 (operation 605), and the RF access node 120 responds with an indication that the network entry request is successful (operation 610). After receiving the success indication from the RF access node 120, the wireless device 110 transmits an authentication request including credentials to the RF access node 120 (operation 615). The RF access node 120 conveys the authentication request to the authentication node 130, which performs an authentication of the wireless device 110 based on the credentials, and determines that the credentials of the wireless device 110 are not valid (operation 620). If the authentication node 130 has not transmitted an authentication failure message to the wireless device 110 a predetermined number of times (operation 625, NO), then the wireless device 110 will retransmit the network entry request and the authentication request. However, if the authentication node 130 determines that the credentials of the wireless device 110 are not valid and transmits an authentication failure response a predetermined number of times, the authentication node 130 determines to grant the wireless device 110 provisional access to the IP data network 150 (operation 625). The RF access node 120 and the IP access node 140 may also negotiate a QoS to be provided to the wireless device 110, which can be based on subscriber account information, available network resources, and/or a QoS level requested by the wireless device 110, as well as other factors (operation 635). Thereafter the wireless device 110 can conduct limited bidirectional communication with the IP data network 150 facilitated by the RF access node 120 and the IP access node 140 (operation 640).

The provisional bidirectional communication between the wireless device 110 and the IP data network 150 can be limited in various ways. For example, access to the IP data network 150 can be limited for a period of time, after which time period the provisional access can be terminated. The provisional access can also be limited to a maximum data rate, so that the wireless device 110 can access network services which are not data rate sensitive, but will not have access to a data rate which can support data rate sensitive applications, such as voice over internet protocol (VoIP) or streaming video applications. The provisional access can also be limited to a maximum amount of data, such that when the wireless device 110 has received a predetermined amount of data from the IP data network 150 the provisional access can be terminated. Thus, a determination is made as to whether a limitation such as those described above is exceeded (operation 645), and if so (YES path), then the bidirectional communication is terminated (operation 650).

The provisional bidirectional communication can be limited in other ways as well. For example, the use of certain data intensive applications, such as VoIP or streaming video applications, can be blocked so that the wireless device 110 may use only a subset of services or functions of the IP data network 150. Blocked applications can be identified at various levels of specificity, such as identifying specific applications to be blocked, or by blocking applications of a specified type or types. In addition, the wireless device 110 can be prevented from using applications or services on the IP data network 150 which require a bandwidth greater than a predetermined threshold, effectively preventing the wireless device 110 from using data rate sensitive applications. Other methods of limiting the access of the wireless device 110 to the IP data network 150 are also possible.

If bidirectional communication continues after operation 645, a determination is made as to whether an authorization activity is performed (operation 655). The limited access to the IP data network 150 can provide the wireless device 110 with the opportunity to remedy the factor or factors that render the device's credentials invalid. For example, if a user account has been suspended because a subscription payment is outstanding, the user can make such payment over the IP data access network. If the wireless device's credential data has been corrupted, the provisional access allows the user to input information, such as account information and/or identifying information, to allow the wireless device 110 to obtain a new credential from the network. Similarly, the wireless device 110 may negotiate the download of a new credential from the network without user involvement. Also, if the wireless device 110 is attempting to access the network from an unauthorized location, such as a foreign network where it is not authorized, the user can input, for example, identity and/or payment information, to be authorized to access to the network from the otherwise unauthorized location. Other authorization activities also possible.

If an authorization activity has not been performed (operation 655, NO), then limited bidirectional communication is continued, subject to any limitation in operation 645. If a user has performed an authorization activity (operation 655, YES), then the wireless device 110 is granted unlimited access to the IP data network 150, and may conduct unlimited bidirectional communication with the IP data network 150 facilitated by the RF access node 120 and the IP access node 140 (operation 660).

Figure 7:
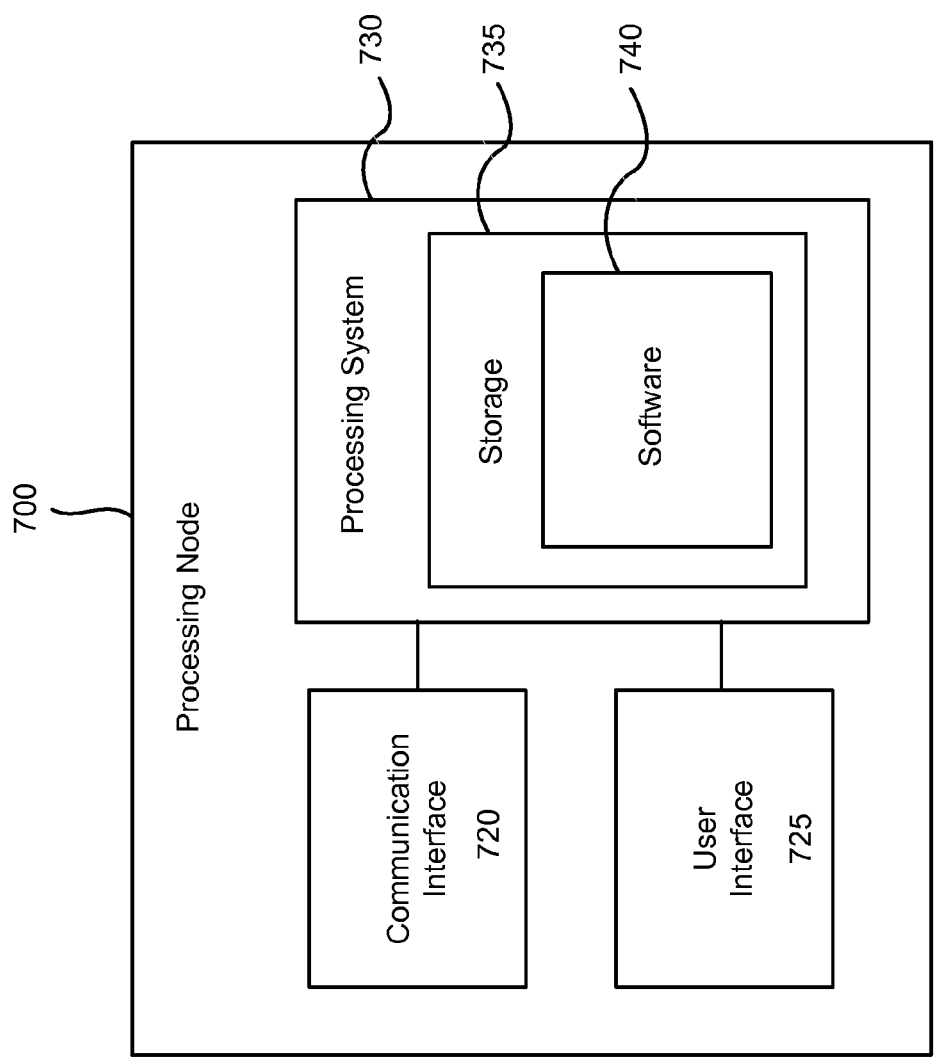
FIG. 7 is a block diagram illustrating an exemplary processing node.

FIG. 7 is a block diagram that illustrates an exemplary processing node 700. Examples of a processing node 600 include the RF access node 120, the authentication node 430, and the IP access node 440. Processing node 700 can include a communication interface 720 and a user interface 725, each in communication with a processing system 730. Processing node 700 can communicate with other network elements, including wireless devices and other processing nodes, over a wired and/or wireless communication link through the communication interface 720. Processing system 730 can include a storage unit 735, comprising a disk drive, flash drive, memory circuitry, or other memory device. Storage unit 735 can store software 740 which is used in the operation of the processing node 700. Software 740 may include an operating system, utilities, drivers, network interfaces, applications, or some other type of software. Storage unit 735 can also store digital content. Processing node 700 can also include a user interface 725 to permit a user to configure and control the operation of the processing node 700.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of processing an access request by a wireless device to access an IP data network, comprising the acts of:
 receiving an access request from the wireless device to access the IP data network;
 denying the access request;
 repeating the receiving and the denying a predetermined plurality of times;
 granting to the wireless device a limited access to the IP data network when the access request is denied the predetermined plurality of times to remedy a factor which caused the denying of the access request, wherein the limited access comprises preventing the wireless device from using services on the IP data network which require a bandwidth greater than a predetermined threshold, and wherein the predetermined threshold is below an amount of bandwidth needed to provide at least one of voice over internet protocol (VoIP) services and streaming video services to the wireless device from the IP data network;
 authenticating the access request when the factor is remedied; and
 granting to the wireless device an unlimited access to the IP data network.

2. The method of claim 1, wherein the limited access comprises permitting the wireless device to access a subset of the unlimited access to the IP data network.

3. The method of claim 1, wherein the limited access comprises limiting the access of the wireless device to the IP data network to a maximum data rate.

4. The method of claim 1, wherein the limited access comprises limiting the access of the wireless device to the IP data network to a maximum amount of data.

5. The method of claim 1, wherein the act of denying further comprises:
 determining that a credential file of the wireless device is corrupted and denying the access request.

6. The method of claim 5, wherein the act of authenticating further comprises: transmitting an uncorrupted credential file to the wireless device and authenticating the access request using the uncorrupted credential file.

7. The method of claim 5, wherein the act of authenticating further comprises at least one of verifying authentication credentials and updating a service agreement, and authenticating the access request using the verified authentication credentials or the updated service agreement.

8. A system for processing an access request by a wireless device to access an IP data network, comprising:
 a radio frequency (RF) access node to receive an access request from the wireless device to access the IP data network;
 an authentication node, in communication with the RF access node, to grant the wireless device a limited access to the IP data network when the access request has been received and denied a predetermined plurality of times to remedy a factor which caused the denial of the access request, and to grant the wireless device an unlimited access to the IP data network when the factor is remedied and the access request is authenticated, wherein the limited access comprises access to the IP network where the wireless device is prevented from using services on the IP data network which require a bandwidth greater than a predetermined threshold, and wherein the predetermined threshold is below an amount of bandwidth needed to provide at least one of voice over internet protocol (VoIP) services and streaming video services to the wireless device from the IP data network; and
 an access node, in communication with the authentication node and the RF access node, to provide the wireless device with the limited access and the unlimited access to the IP data network.

9. The system of claim 8, wherein the limited access comprises access to a subset of the unlimited access to the IP data network.

10. The system of claim 8, wherein the limited access comprises access to the IP data network subject to a maximum data rate limitation.

11. The system of claim 8, wherein the limited access comprises access to the IP network subject to a maximum amount of data limitation.

12. The system of claim 8, wherein the authentication node further determines that a credential file of the wireless device is corrupted and denies the access request.

13. The system of claim 12, wherein an uncorrupted credential file is transmitted to the wireless device and the authentication node authenticates the access request using the uncorrupted credential file.

\* \* \* \* \*